United States Patent
Chevalier et al.

(10) Patent No.: US 8,160,119 B2
(45) Date of Patent: Apr. 17, 2012

(54) METHOD AND DEVICE FOR ANTI-INTERFERENCE FIGHTING IN A TELECOMMUNICATIONS SYSTEM

(75) Inventors: Pascal Chevalier, Courbevoie (FR); François Van De Wiele, Paris (FR); Christophe Donnet, Issy-les-Moulineaux (FR)

(73) Assignee: Thales (FR)

( * ) Notice: Subject to any disclaimer, the term of this patent is extended or adjusted under 35 U.S.C. 154(b) by 364 days.

(21) Appl. No.: 12/296,767

(22) PCT Filed: Apr. 13, 2007

(86) PCT No.: PCT/EP2007/053643
§ 371 (c)(1),
(2), (4) Date: Nov. 23, 2009

(87) PCT Pub. No.: WO2007/122122
PCT Pub. Date: Nov. 1, 2007

(65) Prior Publication Data
US 2010/0061425 A1    Mar. 11, 2010

(30) Foreign Application Priority Data
Apr. 14, 2006  (FR) ...................................... 06 03358

(51) Int. Cl.
*H04B 1/00* (2006.01)
(52) U.S. Cl. ........ 375/132; 375/130; 375/133; 375/134; 375/144; 375/148; 370/203; 370/208; 370/209; 370/320; 370/335; 327/163; 455/42; 455/43; 455/44; 455/45
(58) Field of Classification Search ................... 375/132
See application file for complete search history.

(56) References Cited

U.S. PATENT DOCUMENTS

| | | | | | |
|---|---|---|---|---|---|
| 4,644,523 | A | * | 2/1987 | Horwitz | 370/479 |
| 5,214,788 | A | * | 5/1993 | Delaperriere et al. | 375/132 |
| 5,828,693 | A | * | 10/1998 | Mays et al. | 375/136 |
| 5,991,308 | A | * | 11/1999 | Fuhrmann et al. | 370/395.53 |

(Continued)

FOREIGN PATENT DOCUMENTS
FR    2845218    4/2004

OTHER PUBLICATIONS

Jin Young Kim, "Adaptive Spatial Filtering for an FH/SSMA Packet Radio Network with Packet Combining." International Journal of Wireless Information Networks, vol. 8, No. 1, Jan. 1, 2001, pp. 37-47, XP002413419, Kluwer Academic/Plenum Publishers, Equation 14.

(Continued)

*Primary Examiner* — Shuwang Liu
*Assistant Examiner* — Gina McKie
(74) *Attorney, Agent, or Firm* — Lowe Hauptman Ham & Berner, LLP

(57) ABSTRACT

A method of fighting interference in a frequency-hopping communication system is disclosed. The system has at least one main sensor and one or more auxiliary sensors. According to at least one embodiment, frequency-hopping signals are received. The frequency-hopping signals are arranged to include useful bands and one or more guard bands inserted between the useful bands, and a ratio of the useful bands to the guard bands being chosen according to a predetermined value of probability of interference interception. Signals of the inserted guard bands having a signal level greater than a predetermined threshold are selected. A set of spatial-filtering weightings are calculated according to a correlation matrix of noise plus jammers alone on the signals selected. Baseband signals of the received frequency-hopping signals are filtered by the set of the calculated spatial-filtering weightings.

13 Claims, 4 Drawing Sheets

U.S. PATENT DOCUMENTS

| | | | | |
|---|---|---|---|---|
| 7,512,185 | B2 * | 3/2009 | Sharon et al. | 375/260 |
| 8,014,379 | B2 * | 9/2011 | Capretta et al. | 370/350 |
| 8,014,435 | B2 * | 9/2011 | Brink et al. | 375/135 |
| 2004/0203727 | A1 * | 10/2004 | Abiri et al. | 455/423 |
| 2005/0281242 | A1 | 12/2005 | Sutivong et al. | |
| 2007/0165754 | A1 * | 7/2007 | Kiukkonen et al. | 375/346 |
| 2008/0240028 | A1 * | 10/2008 | Ding et al. | 370/329 |
| 2011/0261861 | A1 * | 10/2011 | Lee et al. | 375/132 |

OTHER PUBLICATIONS

Kamiya, Y.; Besson, O., "A Constant Power Algorithm for Partial-Band Interference Rejection in Frequency-Hopping Communication Systems." XI European Signal Processing Conference, Online, Sep. 3, 2004, pp. 1-4, XP002413420, Toulouse, France, retrieved from the Internet: URL:http://www.eurasip.org/content/Eusipco/2002/articles/paper012.html, retrieved on Jan. 5, 2007, Equations 4, 6, 7.

K. Bakhru D.J. Torrieri, "The Maximin Algorithm for Adaptive Arrays and Frequency Hopping Communications." IEEE Trans Ant Prop, vol. AP-32, No. 9, pp. 919-928, Sep. 1984.

D.J. Torrieri, K. Bakhru, "An Anticipative Adaptive Array for Frequency-Hopping Communications." IEEE Trans Aerosp Elect System, vol. AES-24, No. 4, pp. 449-456, Jul. 1998.

* cited by examiner

METHOD AND DEVICE FOR ANTI-INTERFERENCE FIGHTING IN A TELECOMMUNICATIONS SYSTEM

CROSS-REFERENCE TO RELATED APPLICATIONS

The present Application is based on International Application No. PCT/EP2007/053643, filed on Apr. 13, 2007, which in turn corresponds to French Application No. 0603358, filed on Apr. 14, 2006, and priority is hereby claimed under 35 USC §119 based on these applications. Each of these applications are hereby incorporated by reference in their entirety into the present application.

FIELD OF THE INVENTION

The invention relates notably to a method and a device for anti-interference fighting in a frequency-hopping communication system. It applies, notably, to a frequency evasion or FE satellite-based telecommunication uplink, when the satellite is geostationary. It can be extended to links other than satellite links. The invention finds its application in the field of protecting telecommunications in space or elsewhere, with regard to interference. The application of the invention relates, more generally, to frequency-evasion communications in general.

BACKGROUND OF THE INVENTION

A space link allows several terrestrial stations to communicate with one another, via a satellite, once these stations are situated in the geographical zone (or coverage) delimited by one of the satellite's spots, as shown by FIG. 1. The presence of interference within or outside the coverages may prevent any communication between the stations. The robustness of the links to the presence of interference requires that the links be protected against such interference.

A first protection with regard to interference can be envisaged by implementing a method of frequency evasion (FE) which consists in emitting the information on frequencies which change regularly every T seconds where T is called the duration of the time slot. The frequency change law, called the frequency-hopping law, is generally periodic of long period, thereby rendering it random on a fairly short observation scale. It is known to the satellite and to all the useful stations. It allows the link not to remain for more than T seconds on a channel with interference and to benefit from undisturbed channels if the latter exist.

Although it is effective, this technique, which is aimed at eluding interference rather than rejecting it, is limited in the case of strong interference spread over a very wide band and entailing the pollution of a significant fraction of the number of time slots. For these critical situations, an anti-interference fighting system based on antenna processing is generally added to the FE.

Anti-interference fighting based on antenna processing currently constitutes an effective way of protecting one or more space communications with regard to interference. Anti-interference fighting based on antenna processing consists in implementing an antenna termed adaptive on reception, possessing the capability of adapting its radiation pattern in real time to the signals received by constructing pattern voids in the direction and at the frequency of the interference while preserving a sufficient gain in the direction of the link or links to be protected, as illustrated by FIG. 2. This result can be obtained on the basis of a minimum of information on the links to be protected such as the knowledge of the position of the useful stations, of their band, of the theatre of operation or else of training sequences conveyed by the stations, without a priori knowledge on the interference present.

A certain number of antenna processing systems have been developed for protecting FE links from interference [1] [2]. Nevertheless, most of these systems implement a set of weightings per station [1], which turns out to be very expensive or require the duplication of the reception chains [2].

SUMMARY OF THE INVENTION

The invention relates to a method for fighting interference in a communication system where the links are of frequency-hopping type, the signal consists of several time slots, the system comprising at least one main sensor and one or more auxiliary sensors, characterized in that it comprises at least the following steps:
  inserting one or more guard band between the useful bands of the frequency-evasion signal, grouped together by blocks and by sub-blocks, the total area of the inserted guard bands being chosen so as to satisfy a chosen value of probability of interference interception (so as to intercept the interference), a time slot then consisting of several blocks termed extended (with the guard bands),
  selecting the signals of the guard bands whose level is greater than a given threshold,
  determining a vector of antijamming weightings, for each time slot of the signal, by taking account of the correlation matrix of the noise plus jammers alone on the signals selected on completion of the thresholding,
  filtering by the set of calculated weightings, the baseband signals of the assemblage of useful blocks and sub-blocks of the time slot so as to generate useful blocks and sub-blocks devoid of interference.

The invention also relates to a system for fighting interference present in a communication system where the links are of frequency-hopping type, the signal consists of several time slots, the system comprising at least one main sensor Cp and one or more auxiliary sensors Cl, comprising in combination at least the following elements:
  a device for despreading each time slot of the signal at a given central frequency,
  a transposition chain for despread time slots and a second chain for transposing and digitizing each sub-band of the despread time slot,
  a device for baseband conversion of the real samples available after the first transposition,
  a device for calculating the weighting coefficients,
  means making it possible to apply these weighting coefficients.

The solution proposed in the present invention offers notably the advantages of:
  using, during normal operation, a single set of weightings for the assemblage of stations of a coverage,
  not utilizing any strong a priori on the stations and does not require the duplication of the reception chains. It utilizes a Noise Reference plus interference Alone (NRA) constructed by spectral discrimination between the useful and the interference, that is to say by inserting guard bands between the useful bands. The calculation of the weightings is then performed on the basis of the noise plus interference samples, alone, devoid of the contribution of the useful stations, thereby preventing rejection of the useful stations, The system has no memory and adapts to the interference environment at each time slot independently from one time slot to another. It exhibits a short reaction time.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
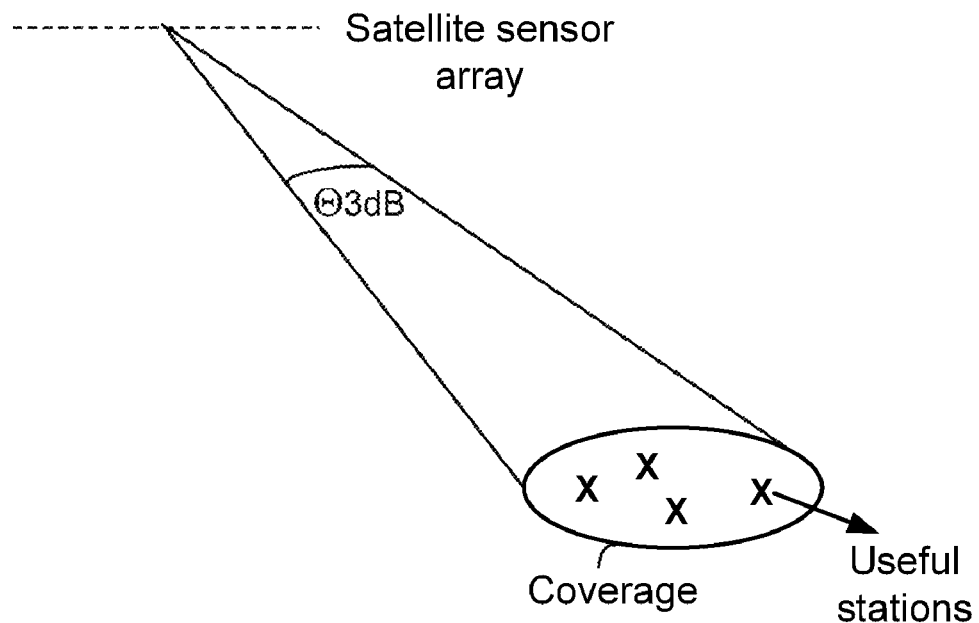
FIG. 1, the representation of a coverage of a satellite.
Figure 2:
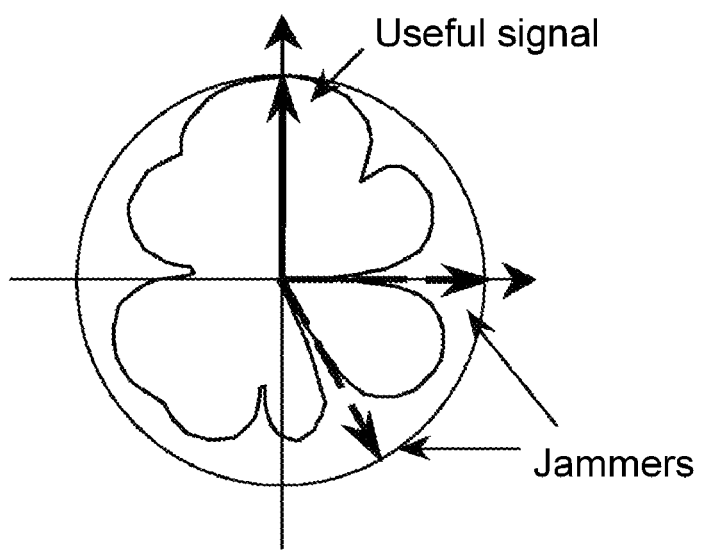
FIG. 2, the radiation pattern of an antenna after rejecting jammers.

In order to better understand the subject of the invention, the description which follows is given by way of illustration for anti-interference fighting based on antenna processing for a frequency-evasion satellite-based telecommunication uplink, when the satellite is geostationary, supplemented with its implementation from the ground.

This method uses the information, assumed available a priori, on the coverages to be protected, on the frequency-hopping law of the useful stations as well as on the bands of the latter. It implements a spatial filter common to all the stations and utilizes the presence of guard bands between the useful bands to discriminate the interference from the useful signals.

It furthermore utilizes the characteristics of the active antenna used on board the satellite and in particular the knowledge of the positions and of the responses of the Radiating Elements (RE) for each direction in space and each polarization of the incident field as well as the gain and the equivalent noise temperatures of the analogue or digital reception chains downstream of the sensors. These parameters make it possible to calculate a spectral noise density at the output of the ADC (analogue digital converter integrated into the chain 2i of FIG. 3) and are involved in adjusting the thresholds.

Before explaining the various steps implemented by the method according to the invention, a few reminders on the signals are recalled.

Signals at the Output of an Array of Sensors on Board the Satellite

Let us consider an array of N sensors of which the first, termed main, is directional towards an assemblage of useful stations whilst the following N−1 called auxiliary are, either omnidirectional, or pointed at interfering sources after an optional prior step of characterizing the interference situation. Each of these N sensors, situated on board the satellite, receives, in a given reception band of width B, the contribution of U useful sources, originating from the theatre of operation, of P interferences disturbing the communications and of a background noise. All these signals are assumed to be narrowband for the array of sensors. Under these assumptions, after despreading the observations, digitizing the signals at the output of the sensors and gauging and equalizing the reception pathways, the vector x(k) of the complex envelopes of the signals at the output of the reception chains may be written, for a given time slot:

$$x(k) = \sum_{u=1}^{U} s_u(k) S_u + \sum_{p=1}^{P} j_p(k) J_p + b(k) \quad (1)$$

where b(k) is the noise vector at the antenna output (contributions of the external noise and of the noise of the reception chains), $j_p(t)$ and $J_p$ correspond respectively to the complex envelope and to the direction vector of the interference p, $s_u(t)$ and $S_u$ correspond respectively to the complex envelope and to the direction vector of the station u.

Statistics of Order 2 of the Signals at the Output of Digitization Chains

Assuming the signals to be decorrelated from one another, the $2^{nd}$-order statistics utilized hereinafter are defined by the averaged correlation matrix of the observations, given by:

$$R_x = E[x(k)x(k)^\dagger] = \sum_{u=1}^{U} \pi_u S_u S_u^\dagger + \sum_{p=1}^{P} \pi_p J_p J_p^\dagger + \eta_2 I \quad (2)$$

where $<.>$ corresponds to the operation of temporal averaging over an infinite observation horizon, $\pi_u = <E[|s_u(k)|^2]>$ is the mean power of station u picked up by an omnidirectional RE, $\pi_p = <E[|j_p(k)|^2]>$ is the mean power of interference p picked up by an omnidirectional RE, $\eta_2$, such that $<E[b(k)b(k)^\dagger]> = \eta_2 I$, is the mean power of the background noise per sensor, assumed to be spatially white.

Formulation of the Problem

The method according to the invention relies notably on the following idea: on the basis of the vectors observed x(k) over a certain duration, the interference present in the main pathway is rejected on the basis of a single set of weightings during normal operation, while protecting the useful stations, doing so without utilizing strong information on the useful stations outside of their band.

Figure 3:
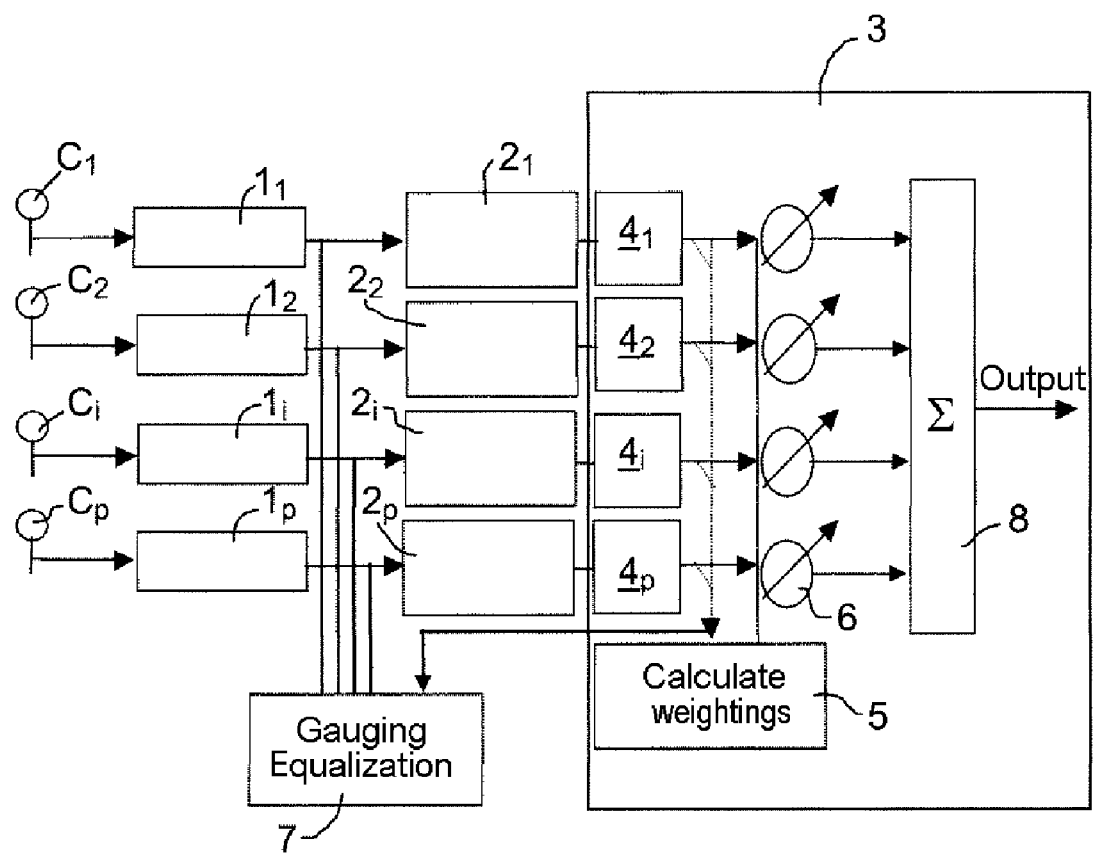
FIG. 3, a general schematic of an anti-interference fighting system according to the invention, FIG. 4, an exemplary calculation and application of the weightings with a short reaction time, FIG. 5, a schematic of an extended block, FIG. 6, a global spectral structure of a time slot, and FIG. 7, an overview of various steps of the method according to the invention for fighting interference.

FIG. 3 represents a general schematic of the anti-interference fighting system according to the invention.

The system comprises a certain number of auxiliary sensors Ci used to reject the interference and a main sensor Cp. The sensors are linked to a device 1i whose function is to despread the frequency-evasion signal, that is to say to refer each of the Frequency Evasion time slots to a given central frequency. The signals are thereafter transmitted to a transposition chain 2i for transposing the despread time slots to a first intermediate frequency FI called FI1. The chain 2i also performs digitization and storage of the transposed signals.

The samples arising from the assemblage of digitization chains are transmitted to a processing unit 3 comprising notably:

means, 4, suitable for constructing the complex baseband samples associated with the available real samples at FI,
an equalization gauging means 7,
a device 5 for calculating the set of anti-interference fighting complex weightings associated with the coverage,
means 6 for applying the set of weightings thus calculated to the useful samples arising from the N digitized pathways corresponding to the pathways of the auxiliary sensors and the pathway of the main sensor,
the weighted signals are thereafter named, 8.

The adaptive filters which are represented in FIG. 3 are filters with a single complex coefficient per pathway. These filters suffice to process a so-called narrow band for the array.

Figure 4:
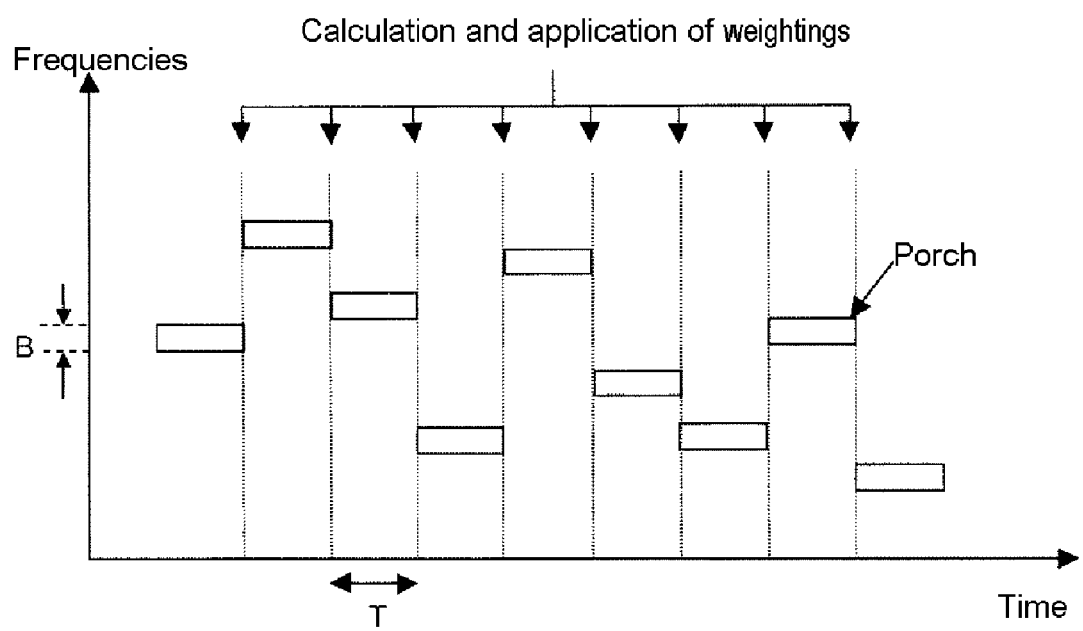

FIG. 4 shows diagrammatically the result of applying a set of weightings to each time slot of the frequency-hopping or frequency-evasion signal on the basis solely of observing the current time slot.

The function of the guard bands is notably to allow:
the analysis of the jamming situation,
the interception of all the interference troublesome to the link,
the calculation of the set of weightings to be applied to the observed signals.

An optional system for analysing interference, working on the basis of the auxiliary sensors, of the initial array used to form the beam of the main sensor or other sensors (dedicated array) potentially has the roles of:
detecting and, if appropriate, locating the interference,
providing, if appropriate, the pointing directions of the auxiliary sensors,
optimizing the choice of the N−1 auxiliary sensors available for the processing. In the absence of the system for analysing the interference situation, the auxiliary sensors are chosen omnidirectional and in number greater than or equal to the maximum number of interferences to be processed.

The function of the sub-system for gauging-equalizing the reception pathways is notably:
to estimate the responses as differential frequencies of the reception chains (gauging),
to deduce therefrom the impulse responses of the equalizer filters to be implemented so as to compensate for these differential responses (equalization).

The function of the spatial filtering sub-system (elements 5 and 6 in FIG. 3) is notably:
to isolate the guard bands from the useful bands,
to calculate the antijamming weighting suited to the current Frequency Evasion time slot,
to apply the weighting to the observed signals.

Sequencing of the Operations

The implementation of the operations relating to the antijamming system comprises for example the following steps:
choosing of the guard bands to be inserted between the useful bands,
choosing of the auxiliary sensors,
On the basis of the optional characterization of the jamming situation,
gauging and equalizing of the reception pathways,
For each time slot of the signal:
despreading of the time slot behind each sensor,
Transposition as despread time slots to a first intermediate frequency FI1 after each sensor,
Transposition to a second intermediate frequency FI2 behind each sensor and digitization for each of the sub-bands of a despread time slot,
analogue Filtering around the total band of the extended time slot for each sensor (an extended time slot is composed of a time slot into which guard bands have been inserted),
Digitization of the extended blocks of the time slot for each sensor which can be performed, for example, according to the following two options:
Option 1:
digitization of the total band,
digital filtering of the extended blocks,
Option 2:
analogue filtering of each extended block,
digitization of the extended blocks one by one (in series or in parallel),
Storage of the assemblage of available samples of the time slot,
for each extended block of the time slot (block extended by the guard band) and each sensor:
Construction of the associated baseband samples,
Isolation by Discrete Fourier Transform (FFT) of the useful sub-bands and of the guard sub-bands of the extended block considered,
Selection of the frequency samples of the extended block considered disturbed by the interference,
Selection of the jammed frequency sample vectors (associated with the assemblage of sensors) of the guard bands of the assemblage of extended blocks of the time slot,
calculation of the set of weightings on the basis of the selected sample vectors. This calculation implements, for example, a solution of OLS with NRA type with a robustification constraint aimed at avoiding the rejection of the weak interference within the coverage,
spatial Filtering, by the set of calculated weightings, of the baseband vector samples of the assemblage of extended blocks of the time slot. In this way one generates all the extended blocks devoid of interference. It is then up to the frequency demultiplex to isolate the contributions of each station within the extended blocks.

Choosing the Guard Bands

As was mentioned above, the idea of the invention relies notably on the use of guard or analysis bands inserted judiciously between the useful or station bands, so as to calculate the set of weightings of the spatial filtering on the basis of the observations associated with these guard bands.

In a more general manner, the area of the guard bands inserted into the signal is determined for example so that the interception of the troublesome interferences (those which pollute the communications) is guaranteed to a given percentage.

For example, the construction of the guard bands is such that the interception of the troublesome interferences is guaranteed in $PB_{max}$% of cases if the waveform tolerates $(100-PB_{max})$% of polluted time slots.

One of the solutions for achieving the result consists, for example, for a given time slot:
in spectrally grouping the useful signals into $P_{u1}$ blocks of equivalent band $B_{u1}$, themselves potentially consisting of $P_{u2}$ sub-blocks of band $B_{u2}$ ($B_{u1}=P_{u2} \times B_{u2}$), the band associated with the throughput below which the anti-interference fighting based on antenna processing is considered to be necessary, in spectrally inserting a guard band of band $B_{g1}$ between each useful sub-block $P_{u2}$ and at the start and at the end of the time slot, in spectrally inserting, in addition to the guard bands $B_{g1}$ and for each useful block of band $B_{u1}$, one or more guard blocks of band $B_{g2}$, having a width slightly greater than $B_{u2}$, in a judicious manner between the useful sub-blocks (sub-blocks of band $B_{u2}$) with a different position from one useful block $B_{u1}$ to another (useful block Pu1 of equivalent band Bu1), so as to definitely intercept the interference troublesome to spectral lines in particular. The useful block with its guard bands is called an extended block, in contriving matters so that the $P_{u1}$ extended blocks of a time slot are contiguous, that is to say with a null space between them. Furthermore the two guard bands at each end of each extended block are common to the neighbouring extended blocks.

Figure 5:
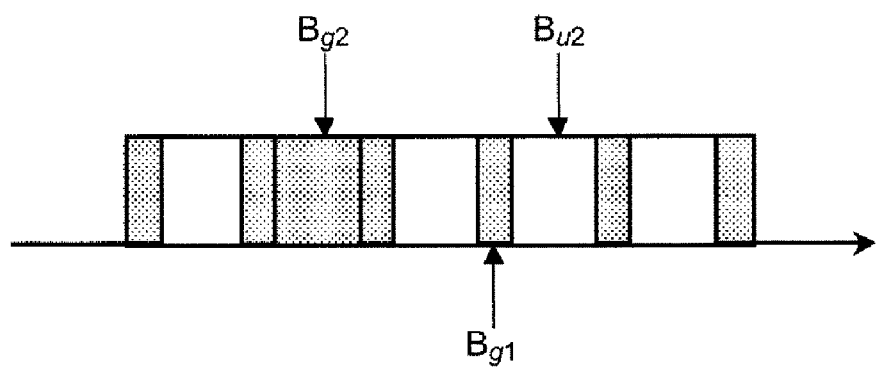
Figure 6:
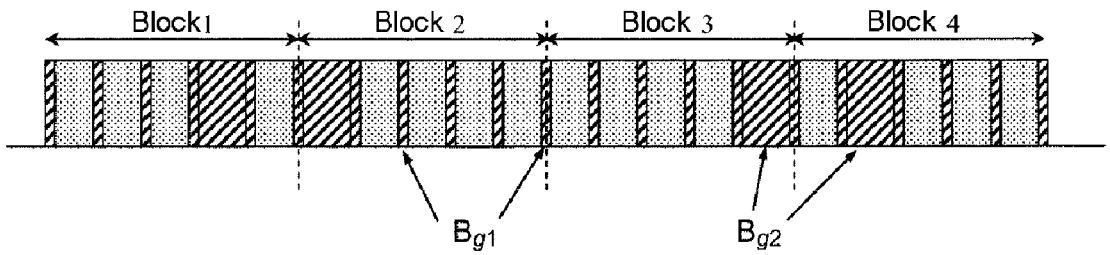
Figure 7:
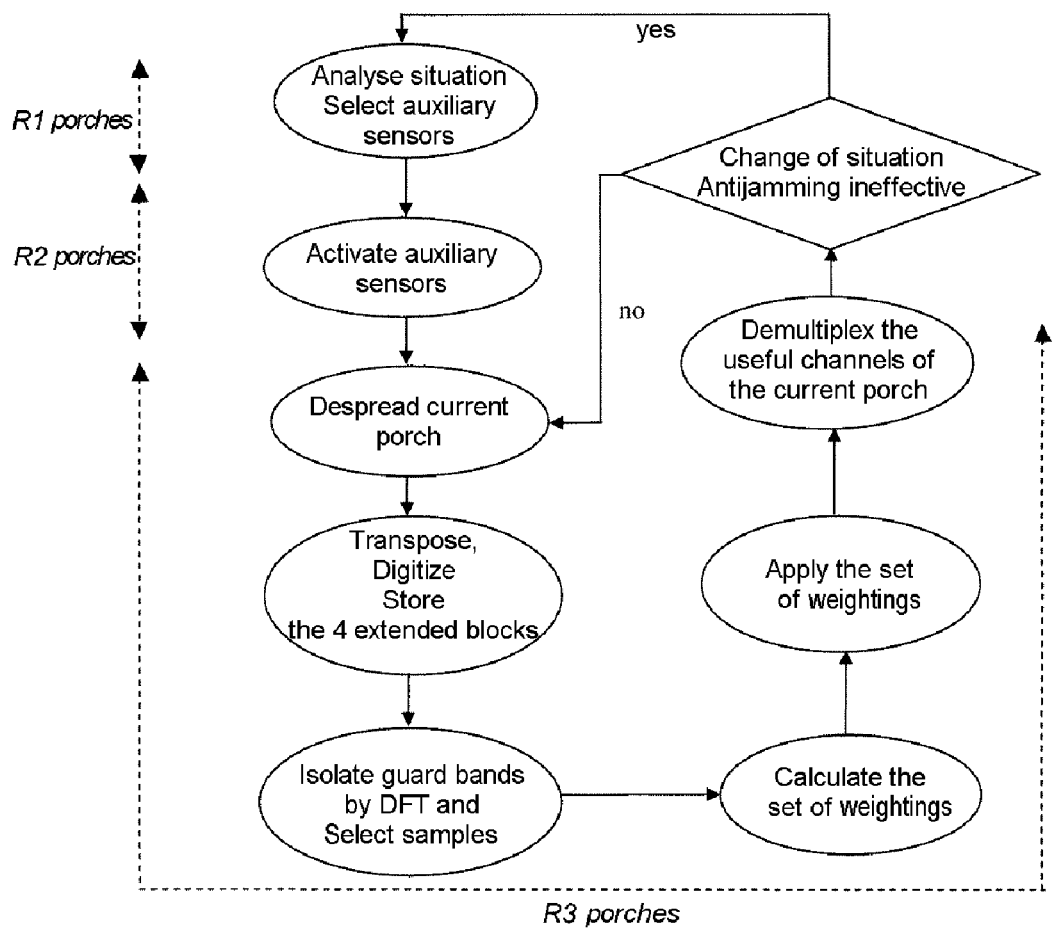

Such a strategy for inserting the guard bands is presented in FIGS. 5 and 6. FIG. 5 presents the schematic of a solution for the extended block where $B_{g1}$=0.37% $B_{u2}$ and $B_{g2}$=1.26% $B_{u2}$. FIG. 6 presents the relative configurations of the extended blocks over $P_{u1}$=4 consecutive blocks.

This strategy nevertheless exhibits the characteristic of increasing the band to be digitized for the spot, by a factor related to the parameterization of the NRA by guard bands. These parameters are:

the band of a useful block, and therefore the number of useful blocks in the time slot, the band and the number of guard blocks $B_{g1}$, the band and the number of guard blocks $B_{g2}$.

These parameters have to be determined so as to obtain an interception of the jammers that is guaranteed in $PB_{max}$ % of cases. Furthermore, this structure being constant per time slot, it makes it possible to envisage a deterministic multiplexer/demultiplexer of the waveform from one time slot to another.

The auxiliary sensors selected are chosen for example in the following manner:

their number must be greater than or equal to the number of interferences to be rejected for the time slot considered, for each of the interferences present, at least one of the auxiliary sensors possesses a greater amplitude response than that of the main sensor in its direction.

The minimum number of interferences to be processed must therefore be known or estimated a priori, so as to correctly dimension the number of auxiliary pathways.

Moreover, without particular analysis of the interference situation, omnidirectional auxiliary sensors can be envisaged. Nevertheless, the choice of auxiliary sensors which are directional towards the interference raises the performance of the system and may turn out to be desirable. Under these conditions, an analysis of the interference situation is required prior to configuration of the auxiliary pathways.

An analysis of the interference situation with the aim of characterizing the interference can be implemented in an initialization phase by analysing the content of the guard bands on R1 time slots. It is possible to use various types of analyses known to the Person skilled in the art.

Gauging and Equalizing the Reception Chains

Any technique for gauging and equalizing the reception chains which is compatible with the hardware architecture used can be envisaged. The invention can implement the technique described in reference [3].

Calculating and Applying the Weightings

The calculation of the weightings and the spatial filtering step implement at least one of the following operations:

isolation of the useful bands and guard bands, thresholding of the level of the samples obtained by the isolation step, calculation of the weightings, application of the weightings, reinitialization.

Isolating the Useful Bands and Guard Bands

For each time slot and for each extended block of the time slot, the operation of isolating the useful bands and guard bands of an extended block can be obtained by Discrete Fourier Transform (DFT) of the baseband samples of this extended block.

We denote by K the number of baseband vector samples, $x(k)$ ($1 \leq k \leq K$), arising from the digitization of the global band $B_e$ of an extended block, with, if appropriate, addition of zeros to obtain a number of samples that is equal to a power of 2 and a maximum resolution corresponding to a fraction of the analysis sub-bands. Henceforth, if $N_p$ is the number of points of the DFT and $N_r$ the number of realizations of the DFTs, the initial number of samples is such that $K=N_p N_r$. For realization r, the DFT of the $N_p$ vector samples $x(k)((r-1)N_p+1 \leq k \leq rN_p)$ generates the series of $N_p$ frequency vector samples $x^r(f_i)$ ($1 \leq i \leq N_p$).

Under these conditions, if the number of useful (sub-)bands and G the number of guard (sub-)bands per extended block is denoted $U_b$, the operation of isolating the useful and guard bands consists, for each of the $N_r$ realizations r of the DFT, in isolating:

for each of the useful bands u ($1 \leq u \leq U_b$) of the extended block, the $N_u$ associated frequency samples, $x^r(f_{ul})$ ($1 \leq l \leq N_u$), for each of the guard bands g ($1 \leq g \leq G$) of the extended block, the $N_g$ associated frequency samples, $x^r(f_{gm})$ ($1 \leq m \leq N_g$).

Thresholding the Level of the Samples

Only the frequency samples of the guard bands of an extended block whose level exceeds a certain threshold are taken into account for the subsequent processing, with the aim of not unnecessarily increasing the background noise level.

More precisely, consideration is given only to the vector frequency samples of the guard bands of an extended block, $x^r(f_{gm})$, such that:

$$x^r(f_{gm})^\dagger x^r(f_{gm}) \geq \text{Threshold} \quad (3)$$

where Threshold is a chosen parameter fixed a priori.

Hereinafter $M_g$ denotes the number of frequency vector samples taken into account for the guard band g of an extended block. In the presence of thresholding, $M_g \leq N_g$.

Calculating the Weightings

The processing relating to the NRA solution adopted is a processing of OLS-NRA type with addition of artificial noise to prevent, if appropriate, the rejection of the weak interference in the coverage that one does not wish to reject.

Considering that sensor 1 is the main sensor and that N−1 auxiliary sensors are selected (at most 3), the set of antijamming weightings w, of dimension N, to be calculated at each time slot is given by:

$$w = (c^\dagger \hat{R}\delta^{-1} c)^{-1} \hat{R}\delta^{-1} c \quad (4)$$

where c is the vector whose first component equals 1 and the others 0, $c^T = (1, 0, \ldots, 0)$, and where $\hat{R};\delta$ is the matrix (N, N) defined by:

$$\hat{R}\delta = \hat{R} + \delta I \quad (5)$$

where δ is the power of the artificial noise added and where $\hat{R};$ is an estimate of the correlation matrix of the noise plus jammers alone on the frequency samples selected on the assemblage of guard bands of the $P_{u1}$ extended blocks of the time slot, defined by:

$$\hat{R} = \frac{1}{Nr} \sum_{r=1}^{Nr} \sum_{l=1}^{Pu1} \sum_{g=1}^{G} \sum_{m=1}^{Mg} x^r(f_{lgm}) x^r(f_{lgm})^\dagger \quad (6)$$

where $x^r(f_{lgm})$ corresponds to the vector sample m selected on the guard band g of the extended block l for realization r of the FFT.

The artificial noise injected is such that:

$$\delta = \alpha \delta_{ref} \quad (7)$$

where $\alpha$ is a constant such that $10 \log_{10}(\alpha)$ has to be adjusted to a certain level and where $\delta_{ref}$ corresponds to the power of the reference artificial noise, dependent on the coverage and the auxiliary sensors, and such that:

$$\sum_{i=1}^{N} \frac{\pi \|J(i)\|^2}{\sigma_i^2 + \delta_{ref}} = 1 \quad (8)$$

where $\pi$ is the maximum power of the interference to be protected, J(i) the component i of the direction vector of this interference and $\sigma_i^2$ the background noise power for sensor i.

Applying the Weightings

Henceforth, on the basis of the set of weightings w and of the baseband vector samples x(k) ($1 \leq k \leq K$), the soundest philosophy consists, for each extended block:

in generating, by spatial filtering of the samples x(k), the baseband samples of the extended block considered devoid of interference, y(k)($1 \leq k \leq K$), given by:

$$y(k) = w^\dagger x(k) \quad (9)$$

in dispatching these samples relating to an extended block to the channel demultiplexing system for filtering and demodulation.

Reinitialization

Should a change in the jamming situation be detected or else should the antijamming be ineffective, it is advisable to rerun the phase of selecting the auxiliary sensors to be digitized.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

REFERENCES

[1] K. BAKHRU, D. J. TORRIERI, "The maximin algorithm for adaptive arrays and frequency hopping communications", IEEE Trans Ant Prop, Vol AP-32, N° 9, pp. 919-928, September 1984

[2] D. J. TORRIERI, K. BAKHRU, "An anticipative adaptive array for frequency-hopping communications", IEEE Trans Aerosp Elect System, Vol AES-24, N° 4, pp. 449-456, July 1988

[3] C. DONNET, P. CHEVALIER, "Procédé et dispositif de tarage-égalisation d'un système de réception" [Method and device for gauging-equalizing a reception system], N° 02.12010, September 2002.

The invention claimed is:

1. A method of fighting interference in a frequency-hopping communication system, the system comprising at least one main sensor and one or more auxiliary sensors, the method comprising:

receiving frequency-hopping signals, the frequency-hopping signals being arranged to include useful bands and one or more guard bands inserted between the useful bands, a ratio of the useful bands to the one or more guard bands being chosen according to a predetermined value of probability of interference interception, a first number of bands including the useful bands and the one or more guard bands being grouped as an extended block, and a number of contiguous extended blocks being grouped as a time slot;

selecting signals of the inserted one or more guard bands having a signal level greater than a predetermined threshold;

calculating a set of spatial-filtering weightings, for the time slot, according to a correlation matrix of noise plus jammers alone on the signals selected; and filtering, by the set of the calculated spatial-filtering weightings, baseband signals of the received frequency-hopping signals, wherein a number and a position of the one or more guard bands inserted between the useful bands are chosen so as to discriminate useful emitters from the interference and so as to guarantee the probability of interference interception in $PB_{max}$% of cases if a waveform tolerates (100–$PB_{max}$)% of jammed time slots, wherein the insertion of the one or more guard bands comprises:

spectrally inserting at least one first guard band of the one or more guard bands, between each useful bands, at a boundary and in common to neighboring extended blocks, and at a start and at an end of the time slot; and spectrally inserting, at least one second guard band of the one or more guard bands in a corresponding one of the useful bands, the second guard band having a width greater than that of the first guard band.

2. A method of fighting interference in a frequency-hopping communication system, the system comprising at least one main sensor and one or more auxiliary sensors, the method comprising:

receiving frequency-hopping signals, the frequency-hopping signals being arranged to include useful bands and one or more guard bands inserted between the useful bands, a ratio of the useful bands to the one or more guard bands being chosen according to a predetermined value of probability of interference interception, a number of bands including the useful bands and the one or more guard bands being grouped as an extended block, and a number of contiguous extended blocks being grouped as a time slot;

selecting signals of the inserted one or more guard bands having a signal level greater than a predetermined threshold;

calculating a set of spatial-filtering weightings, for the time slot, according to a correlation matrix of noise plus jammers alone on the signals selected; and filtering, by the set of the calculated spatial-filtering weightings, baseband signals of the received frequency-hopping signals, wherein the calculation of the set of the spatial-filtering weightings coefficients comprises at least the following steps:

for each time slot and for each extended block of the time slot, the step of isolating the useful bands and the one or more guard bands by performing the following steps:

let K be the number of baseband vector samples, x(k) ($1 \leq k \leq K$), arising from a digitization of the global band Be of an extended block of the number of contiguous extended blocks, let $N_p$ be the number of points of a Discrete Fourier Transform (DFT) and $N_r$ a number of realizations of the DFTs, for realization r, the DFT of the $N_p$ vector samples $x(k)((r-1)N_p+1 \leq k \leq rN_p)$ generates the series of $N_p$ frequency vector samples $x^r(f_i)$ ($1 \leq i \leq N_p$), let $U_b$ be the number of useful bands and G the number of one or more guard bands per extended block, the operation of isolating the useful bands and the one or more guard bands consists, for each of the $N_r$ realizations r of the DFT, of:

for each of the useful bands u ($1 \leq u \leq U_b$) of the extended block, isolating $N_u$ associated frequency samples, $x^r(f_{ul})$ ($1 \leq l \leq N_u$), and for each of the guard bands g ($1 \leq g \leq G$) of the extended block, isolating Ng associated frequency samples, $x^r(f_{gm})$ ($1 \leq m \leq N_g$).

3. A method of fighting interference in a frequency-hopping communication system, the system comprising at least one main sensor and one or more auxiliary sensors, the method comprising:

receiving frequency-hopping signals, the frequency-hopping signals being arranged to include useful bands and one or more guard bands inserted between the useful bands, a ratio of the useful bands to the one or more guard bands being chosen according to a predetermined value of probability of interference interception, a first number of bands including the useful bands and the one or more guard bands being grouped as an extended block, and a number of contiguous extended blocks being grouped as a time slot;

selecting signals of the inserted one or more guard bands having a signal level greater than a predetermined threshold;

calculating a set of spatial-filtering weightings, for the time slot, according to a correlation matrix of noise plus jammers alone on the signals selected; and filtering, by the set of the calculated spatial-filtering weightings, baseband signals of the received frequency-hopping signals, wherein the predetermined threshold is determined on the basis of vector frequency samples of the one or more guard bands of an extended block of the number of contiguous extended blocks, and baseband vector samples $x^r(f_{gm})$, satisfying $x^r(f_{gm})^\backprime\, x^r(f_{gm}) >$Threshold where "Threshold" is the predetermined threshold.

4. A method of fighting interference in a frequency-hopping communication system, the system comprising at least one main sensor and one or more auxiliary sensors, the method comprising:

receiving frequency-hopping signals, the frequency-hopping signals being arranged to include useful bands and one or more guard bands inserted between the useful bands, a ratio of the useful bands to the one or more guard bands being chosen according to a predetermined value of probability of interference interception, a number of bands including the useful bands and the one or more guard bands being grouped as an extended block, and a number of contiguous extended blocks being grouped as a time slot;

selecting signals of the inserted one or more guard bands having a signal level greater than a predetermined threshold;

calculating a set of spatial-filtering weightings, for the time slot, according to a correlation matrix of noise plus jammers alone on the signals selected; and filtering, by the set of the calculated spatial-filtering weightings, baseband signals of the received frequency-hopping signals, wherein the set of spatial-filtering weightings w, of dimension N, to be calculated at each time slot is given by:

$$w = (c^\backprime \hat{R}\delta^{-1} c)^{-1} \hat{R}\delta^{-1} c$$

where c is the vector whose first component equals 1 and the others 0, $c^T = (1, 0, \ldots, 0)$, and where $\hat{R}$ is the matrix (N, N) defined by:

$$\hat{R}\delta = \hat{R} + \delta I$$

where $\delta$ is power of an added artificial noise and where $\hat{R}$ an estimate of the correlation matrix of the noise plus interference alone on the frequency samples selected on assemblage of the one or more guard bands of Pu1 extended blocks of the time slot, and defined by:

$$\hat{R} = \frac{1}{Nr} \sum_{r=1}^{Nr} \sum_{l=1}^{Pu1} \sum_{g=1}^{G} \sum_{m=1}^{Mg} x^r(f_{lgm}) x^r(f_{lgm})^\dagger$$

where $x^r(f_{lgm})$ corresponds to a vector sample m selected on the guard band g of the extended block/for realization r of a Discrete Fourier Transform (DFT).

5. The method according to claim 4, wherein the power of the artificial noise is of the form:

$$\delta = \alpha \delta_{ref}$$

where $\alpha$ is a constant such that $10 \log_{10}(\alpha)$ has to be adjusted to a certain level and where $\delta_{ref}$ corresponds to a power of the reference artificial noise, dependent on coverage and the auxiliary sensors, and such that:

$$\sum_{i=1}^{N} \frac{\pi \|J(i)\|^2}{\sigma_i^2 + \delta_{ref}} = 1$$

where $\pi$ is a maximum power of interference to be protected, J(i) the component i of a direction vector of this interference and $\sigma_i^2$ is background noise power for sensor i.

6. The method according to claim 1, wherein the frequency-hopping signals are frequency-evasion signals.

7. The method according to claim 1, wherein the at least one main sensor and the one or more auxiliary sensors are implemented in a satellite application.

8. The method according to claim 2, wherein the frequency-hopping signals are frequency-evasion signals.

9. The method according to claim 2, wherein the at least one main sensor and the one or more auxiliary sensors are implemented in a satellite application.

10. The method according to claim 3, wherein the frequency-hopping signals are frequency-evasion signals.

11. The method according to claim 3, wherein the at least one main sensor and the one or more auxiliary sensors are implemented in a satellite application.

12. The method according to claim 4, wherein the frequency-hopping signals are frequency-evasion signals.

13. The method according to claim 4, wherein the at least one main sensor and the one or more auxiliary sensors are implemented in a satellite application.

\* \* \* \* \*